(No Model.)

T. GARRICK.
CHECK HOOK OR TERRET.

No. 275,817. Patented Apr. 17, 1883.

WITNESSES,

INVENTOR,
Thomas Garrick

UNITED STATES PATENT OFFICE.

THOMAS GARRICK, OF PROVIDENCE, RHODE ISLAND.

CHECK HOOK OR TERRET.

SPECIFICATION forming part of Letters Patent No. 275,817, dated April 17, 1883.

Application filed January 11, 1883. (No model.)

*To all whom it may concern:*

Be it known that I, THOMAS GARRICK, of the city of Providence, in the county of Providence and State of Rhode Island, have invented a new and useful Improvement in Terrets and Check or Water Hooks to be Used on Harness, which improvement is fully set forth in the following specification, reference being had to the accompanying drawings.

The object of my invention is to secure the reins or overdraw to or in the terret or check hook, and to more easily detach the same from the terret or check hook when they are in use.

Figure 2:
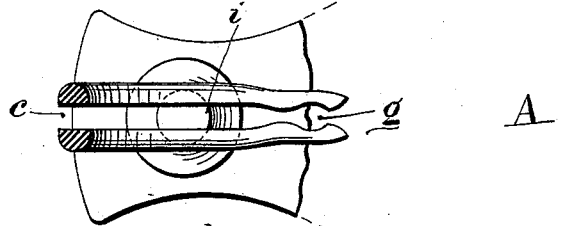
Figure 1:
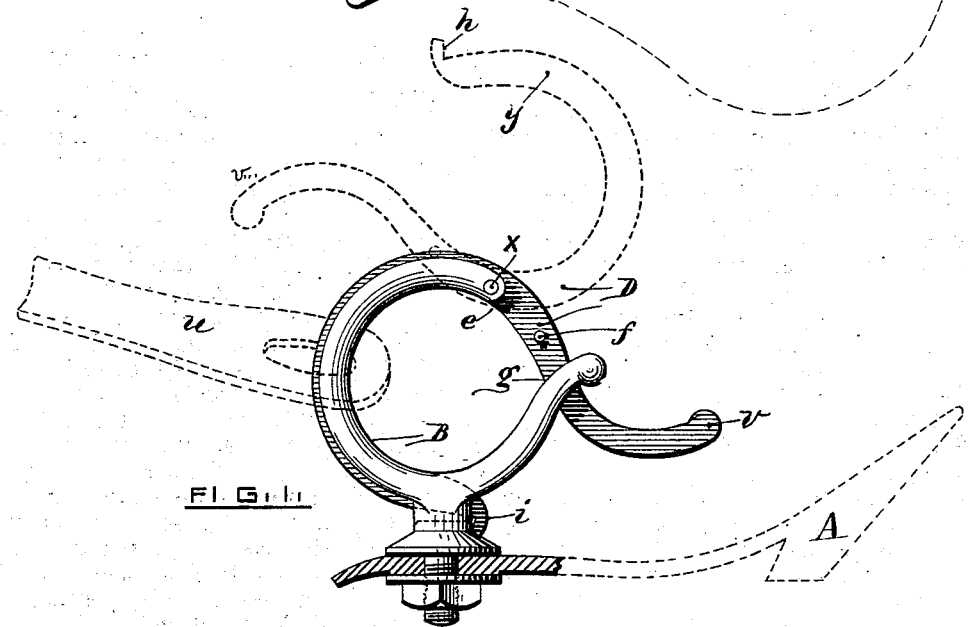
Figure 3:
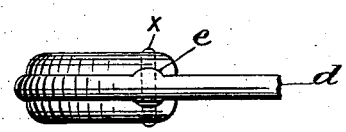
Figure 3:
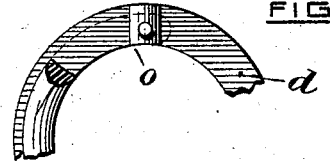

Figure 1 is a side elevation of the terret or check hook, opened and closed, adjusted to the saddle-plate, with overdraw attached. Fig. 2 is a vertical section of the terret or check hook and saddle-plate, with lever and portions of the terret or check hook detached. Fig. 3 is a vertical section of a portion of the terret or check hook, showing a clutch-spring hinge, and a side elevation, showing a clutch or jaw with portions of the lever.

A is the saddle-plate. (See Figs. 1 and 2.) B is the terret or check hook, (see Fig. 1,) with slot $c$, as seen in Fig. 2, to receive lever D, which is secured to terret or check hook B at $e$ by reason of pin $x$ passing through the jaws of terret or check hook B and lever D at $e$. (See Fig. 1.) $f$ is a stop-pin to prevent the handle $v$ of lever D from entering slot $c$ when lever D is thrown open to detach or secure the reins or overdraw $u$ from or to terret or check hook B by means of depressing or elevating the handle $v$, and hook $y$, upon lever D, serves to throw the reins or overdraw $u$ from terret or check hook B, by means of elevating handle $v$, (see lever D and dotted lever D, Fig. 1,) though hook portion $y$ of lever D may be dispensed with from the rear of joint $e$, as handle $v$ of lever D will secure the reins or overdraw. I prefer the hook $y$ upon lever D.

The reins or overdraw is secured in or to the terret or check hook by reason of handle $v$ of lever D being pressed into slot $c$ at $g$, a portion of the metal being removed in slot $c$ at $g$ (see Figs. 1 and 2) to conform to and hold handle $v$ in position by means of a clutch-spring, made of the jaws of the terret or check hook, at $g$. The stop $h$, upon lever D, is to prevent the handle $v$ from entering slot $c$ any farther than $g$ by reason of its coming in contact with the bolster of the terret or check hook B at $i$. (See Figs. 1 and 2.) Terret or check hook B is adjusted to saddle-plate A by means of a screw passing through the saddle-plate into the bolster of the terret or check hook, or in the usual way by means of a nut.

The handle $v$ upon lever $d$ (see Fig. 3) may be extended down to the saddle-plate and held in that position by reason of a clutch-spring hinge, $d$ being the lever, with additional metal at $e$ to conform with slot $o$, and secured to the terret or check hook by pin $x$, passing through the jaws of the terret and the lever, and secured to one of said jaws at $e$, which admits of said jaws springing open and closing to conform to the additional metal on lever $d$ at $e$. I prefer the mode of securing the handle of the lever as seen in Figs. 1 and 2, because the handle of the lever is held in position more firm.

I claim as my invention—

The clutch-spring $g$, in combination with lever D and terret or check hook B, substantially as and for the purposes hereinbefore set forth.

THOMAS GARRICK.

Witnesses:
WILLIAM A. CHAMPLAIN,
LE ROYS R. WHITMAN.